March 7, 1950     L. FINE ET AL     2,499,577
METHOD OF INSPECTING WELDS
Filed Aug. 23, 1946
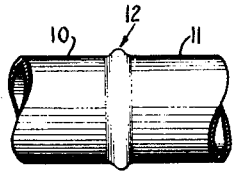
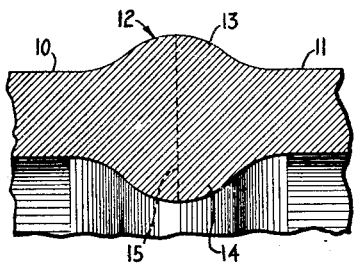
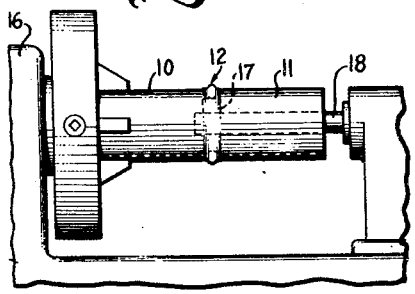
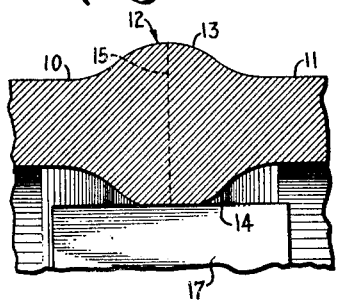
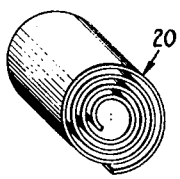
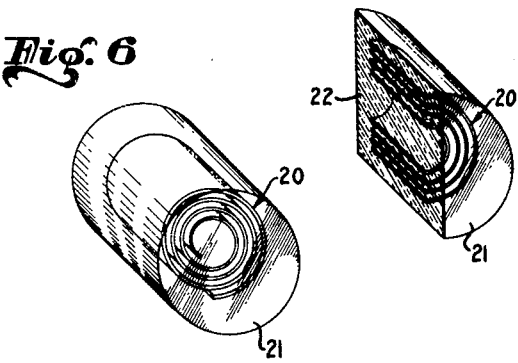
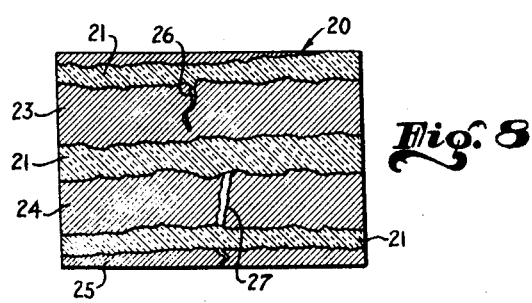
INVENTORS.
LESLIE FINE.
ANTHONY R. OZANICH.
BY
Huebner Malsby + Beehler
ATTORNEYS.

Patented Mar. 7, 1950

2,499,577

UNITED STATES PATENT OFFICE 2,499,577

METHOD OF INSPECTING WELDS

Leslie Fine and Anthony R. Ozanich, Burbank, Calif., assignors to Menasco Manufacturing Company, Burbank, Calif., a corporation of California Application August 23, 1946, Serial No. 692,536

2 Claims. (Cl. 41—42)

This invention relates to welding generally and more especially to a novel method of inspecting or examining welded joints made by pressure welding procedure.

The method of inspecting or examining welds as disclosed in this application pertains to welding generally, but is directed more specfically to welded joints in tubular structures, wherein the welds are made by combination of pressure and heat, using oxyacetylene or other source of heat. The welds described herein are such as have been made in a range of carbon and alloy steels and more particularly medium carbon and low alloy steels, and the structural parts are such as used in the manufacture of aircraft landing gear. The surfaces joined are the butting ends of the tubular members, the two machined faces of the parts to be welded being brought together under pressure at the sametime heat is applied to the area of the weld plane until sufficient upsetting takes place.

Upon examination of experimental welds made in this manner, poorly bonded areas and/or fissures have been found to occur on the internal upsets. However, comparatively rarely have poorly bonded areas and/or fissures been found in the external upsets, which may be due to the application of the heat externally of the weld region rather than internally thereof. Test samples in specimens which were substandard, or suspected of being faulty, were examined by a nital etch of the plane at juncture; that is, the weld plane. However, microscopic examination did not reveal any illuminating information other than the detection of obvious fissures. As a probable cause of poor quality weld bond, the presence of oxygen in the weld was suspected and, after examination of samples by an alkaline chromate solution, the presence of oxygen at the weld plane was clearly established. (The alkaline chromate method is described in the co-pending application of Leslie Fine, Serial No. 620,944, filed October 8, 1945.)

Samples of welds have been examined by the alkaline chromate etch which show that diffusion of oxygen into the steel occurs when steel is exposed to air at high temperature, and that diffusion takes place without any precipitation until saturation occurs. Two causes of failures in pressure welds are, therefore, due to the presence of oxygen at the weld plane and/or the presence of a fissure. As stated above, fissures have been found in the internal upsets of pressure welds in tubular structures and, while some small fissures and occasional oxygen rich areas have been found in the external upsets, the upsets of the latter can be readily machined down below the depth of the fissures and/or oxygen areas to remove whatever defects may be present. The presence of fissures and/or oxygen at the weld plane in the area of the internal upsets quite often would not be removed by machining off the internal upset because such areas may extend well into the wall of the tube. Also magnetic inspection and other known methods are not capable of detecting such areas of poor bond or minute fissures. In the case of magnetic inspection, which is capable of revealing even small fissures, this process is not usable because quite often it produces indications at the weld plane of a perfectly sound bond. It is, therefore, an object of this invention to provide a novel method of checking and examining pressure welds to determine the presence of fissures or oxygen in the weld plane and particularly the internal upset portion thereof in the welds of tubular structures.

A more specific object of the invention is to provide a method of examining the internal welds of tubular structures by the taking of samples of material from the weld plane region and treating such samples, including employment of a suitable etch to reveal imperfect weld conditions caused by the presence of oxygen at the weld plane.

A further and more specific object of the invention is to provide a novel method of checking and examining the internal and/or external upset portions of welds in tubular structures, wherein samples of material are taken from the region of the weld plane and suitably embedded in a plastic or moldable block, which, after hardening, is cut or sawed across the weld plane and one or more of the transverse surfaces of the weld material examined microscopically, utilizing an alkaline chromate etch.

Other objects and advantages will appear and be brought out more fully in the following specification and considered with reference to the accompanying drawing throughout which like parts are designated by like numerals.

In the drawings:

Figure 1 is a view showing the external weld portion of a pressure weld joining the end portions of tubular members.

Figure 2 is an enlarged partial view in longitudinal section showing a portion of a weld of Figure 1.

Figure 3 is a view showing a step in the taking of a sample of the weld material in a weld such as shown in Figures 1 and 2.

Figure 4 is a view similar to Figure 2 showing the cutting tool during the taking of a sample as shown in Figure 3.

Figure 5 is a perspective view of a sample taken from the internal upset of the weld of Figures 1 to 4.

Figure 6 is a perspective view showing the sample of Figure 5 embedded in a plastic or molded block, illustrating a step in the method of our invention.

Figure 7 is a perspective view showing the block of Figure 6 including the sample after being cut along a plane transverse to the weld plane.

Figure 8 is a microscopic view of a portion of the sample as seen in Figure 7.

Referring more particularly to the drawing, we show tubular members 10 and 11 which have been butt welded by the application of pressure and heat, the heat being applied by an external ring burner furnishing an oxy-acetylene flame or equivalent form of heat, the weld being indicated at 12 and including an external upset 13 and an internal upset 14, the weld plane being indicated by the dotted line 15.

In order to obtain a sample of the internal upset 14, the tubular section, including a portion of members 10 and 11, is suitably mounted in a lathe or boring machine 16 having a cutting tool of any suitable type. A radial cutting tool 17, suitably mounted in a boring bar 18, is operated to cut a thin layer from the internal upset, the sample being indicated at 20 which will assume a spiral or helical form, as shown in Figures 5 and 6, several layers of the strip usually resulting from such a cut.

The sample 20 is then embedded in a plastic or moldable block 21, such as Lucite, and after hardening, the block is cut along a plane 22 parallel to the axis of tubular members 10 and 11, transverse to the weld plane 15 and substantially diametrically of the helix of the sample. This cut results in a plurality of surface portions 23, 24 and 25 in the steel sample and these surfaces are then etched with an alkaline chromate etch and the block suitably mounted in a microscope for examination or study of the weld plane region. The alkaline chromate, as described in the copending application above referred to, comprises 16 grams of chromic acid and 145 milliliters of distilled water to which 80 grams of caustic soda has been added and the same heated to boiling and kept boiling at 118° to 120° C. The sample to be etched is placed in the boiling solution for two to twenty minutes, then removed and rinsed in cold water and then in alcohol. After the removal of the alcohol by rubbing the surface with a soft tissue, the sample is ready for micro-examination.

Figure 8 shows fissures 26 and oxygen rich zones 27 which occurred in a sample under test and examination, and if any fissures be present or any oxygen is present in the weld plane region, the presence thereof can be determined and the extent thereof analyzed.

The merits and advantages of our method of checking and examining of welds should be clear from the foregoing description. The taking of the sample chip from the internal upset permits a thorough and revealing study of the weld plane region, it being readily permissible in cutting the sample to run the cut to within a few thousandths of an inch of the internal bore of the tube stock, since the material forming the internal upset does not materially add to the strength of the weld which is usually equal to that of the tube stock. Oxygen, if present in the weld plane region, can be readily determined by the alkaline chromate etch process and the extent thereof determined by suitable comparisons with sample welds of known quality.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent methods and systems.

Having thus described our invention, what we claim and desire to secure by Letters Patent is:

1. The method of testing the inner upset surface of a butt weld in ferrous alloy tubing comprising the steps of machining a shaving from said inner upset having a thickness less than said upset and a length at least as great as the inner circumference of said tubing so as to produce a spiral shaving, embedding said shaving in a moldable resinous plastic, cutting said plastic and said shaving along a line normal to the weld plane to thereby expose a plurality of weld line surfaces for testing said weld, and etching said exposed surfaces to determine the presence of defects in said weld.

2. The method of testing the inner upset surface of a pressure weld in ferrous alloy tubing comprising the steps of machining a shaving from said inner upset having a thickness less than said upset and a length at least as great as the inner circumference of said tubing so as to produce a spiral shaving, embedding said shaving in a moldable resinous plastic, cutting said plastic and said shaving along a line normal to the weld plane to thereby expose a plurality of weld line surfaces for testing said weld and etching said exposed surfaces with an alkaline chromate to thereby ascertain oxygen absorption of said weld.

LESLIE FINE.
ANTHONY R. OZANICH.

REFERENCES CITED

The following references are of record in the file of this patent:

UNITED STATES PATENTS

| Number | Name | Date |
|---|---|---|
| 1,397,541 | Owens | Nov. 22, 1921 |
| 1,795,481 | Eaton | Mar. 10, 1931 |
| 1,937,820 | Howard | Dec. 5, 1933 |
| 2,329,653 | Rogoff | Sept. 14, 1943 |
| 2,350,421 | Schoder | June 6, 1944 |